(12) United States Patent
Lo et al.

(10) Patent No.: US 10,437,883 B2
(45) Date of Patent: Oct. 8, 2019

(54) EFFICIENT GRAPH DATABASE TRAVERSAL

(71) Applicant: Cisco Technology, Inc., San Jose, CA (US)

(72) Inventors: Jeffrey Y. D Lo, Cupertino, CA (US); Pratap Pereira, Saratoga, CA (US); Tzewei Sou, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 223 days.

(21) Appl. No.: 15/287,970

(22) Filed: Oct. 7, 2016

(65) Prior Publication Data
US 2017/0147708 A1 May 25, 2017

Related U.S. Application Data

(60) Provisional application No. 62/259,239, filed on Nov. 24, 2015.

(51) Int. Cl.
*G06F 16/901* (2019.01)
*G06F 16/2452* (2019.01)
*G06F 16/2455* (2019.01)
*G06F 16/22* (2019.01)
*G06F 16/242* (2019.01)

(52) U.S. Cl.
CPC ...... *G06F 16/9024* (2019.01); *G06F 16/2246* (2019.01); *G06F 16/2272* (2019.01); *G06F 16/2445* (2019.01); *G06F 16/24526* (2019.01); *G06F 16/24557* (2019.01); *G06F 16/24558* (2019.01); *G06F 16/24562* (2019.01)

(58) Field of Classification Search
CPC ......... G06F 17/30958; G06F 17/30545; G06F 17/3048; G06F 11/1464; G06F 17/30516; G06F 17/30439; G06F 16/9024
See application file for complete search history.

(56) References Cited

U.S. PATENT DOCUMENTS 6,381,616 B1 * 4/2002 Larson ............... G06F 17/30439
7,617,183 B1 * 11/2009 Harvey ............. G06F 17/30439
(Continued)

OTHER PUBLICATIONS

"Performance evaluation of object serialization libraries in XML, JSON and binary formats," 2012 Second International Conference on Digital Information and Communication Technology and it's Applications (DICTAP), Bangkok, 2012, pp. 177-182.*
(Continued)

*Primary Examiner* — James Trujillo
*Assistant Examiner* — Michal Lawrence Bogacki
(74) *Attorney, Agent, or Firm* — Behmke Innovation Group LLC; James Behmke; Stephen D. LeBarron

(57) ABSTRACT

In one embodiment, an operating system on a computer device interfaces with a graph database that has data nodes interconnected by relationship edges. The operating system generates database instructions that specify a database operation for a target node in the graph database and a node traversal list through the graph database to reach the target node. By then transmitting the database instruction to the graph database, the graph database (e.g., a database management operating system) traverses the specified node traversal list through the graph database to the target node, and performs the database operation on the target node.

20 Claims, 12 Drawing Sheets

(56) References Cited

U.S. PATENT DOCUMENTS

| | | | | |
|---|---|---|---|---|
| 8,176,089 | B1* | 5/2012 | Nandy | G06F 17/2205 707/802 |
| 2002/0069193 | A1* | 6/2002 | Beavin | G06F 17/30454 |
| 2006/0085533 | A1* | 4/2006 | Hussain | G06F 17/30985 709/223 |
| 2008/0033907 | A1* | 2/2008 | Woehler | G06F 17/30439 |
| 2012/0179699 | A1* | 7/2012 | Ward | G06F 17/30589 707/754 |
| 2014/0279837 | A1* | 9/2014 | Guo | G06F 17/30589 707/603 |
| 2015/0112783 | A1* | 4/2015 | Nikolaev | G06Q 30/0217 705/14.19 |
| 2015/0112998 | A1* | 4/2015 | Shankar | G06F 17/30312 707/741 |
| 2016/0110412 | A1* | 4/2016 | Sun | G06F 17/30312 707/769 |
| 2017/0060912 | A1* | 3/2017 | Liu | G06F 17/3033 |
| 2017/0141791 | A1* | 5/2017 | Balegar | H03M 7/60 |

OTHER PUBLICATIONS

"Associative access by hashing" Gray, J; Reuter, A; Transaction Processing; Morgan Kaufmann; Sep. 30, 1992; Ch. 15.3.*

"Preface", Silberschatz, A; Galvin, P.B.; Gagne, G; Operating System Concepts, Seventh Edition; John Wiley & Sons; Dec. 14, 2004, p. vii.*

"Adding in Javascript", Abraham, Nikhil; Coding for Dummies; For Dummies (publisher); Feb. 24, 2015; Ch. 9.*

"Computer Programming Languages"; Groover, M.P.; Zimmers, E.Z.; CAD/CAM: Computer-Aided Design and Manufacturing; Prentice Hall; Dec. 1, 1983. Ch. 2.6.*

"Examples of transaction-oriented programming style" Gray, J; Reuter, A; Transaction Processing; Morgan Kaufmann; Sep. 30, 1992; Ch. 5.5.*

* cited by examiner

EFFICIENT GRAPH DATABASE TRAVERSAL

RELATED APPLICATION

This application claims priority to U.S. Prov. Appl. Ser. No. 62/259,239, filed on Nov. 24, 2015, entitled EFFICIENT GRAPH DATABASE TRAVERSAL, by Lo, et al., the contents of which are herein incorporated by reference.

TECHNICAL FIELD

The present disclosure relates generally to computer network operating systems, and, more particularly, to efficient graph database traversal.

BACKGROUND

An operating system (OS) is system software that manages computer hardware and software resources, and provides common services for computer programs. General operating systems perform basic tasks, such as recognizing input from the keyboard, sending output to the display screen, keeping track of files and directories on the disk, and controlling peripheral devices such as disk drives and printers.

A computer network operating system, specifically, is a specialized operating system for a network device such as a router, switch, firewall, and so on. For instance, the Internetwork Operating System (IOS) available from Cisco Systems, Inc. is an example computer network operating system, where the IOS software used on routers and switches provides a package of routing, switching, internetworking, and telecommunications functions integrated into a multitasking operating system. For example, a computer network operating system can provide IP routing (basic, IPv4, IPv6, etc.) for data, voice, video, etc., and can provide security services and virtual private network (VPN) services as well as a myriad of other features, such as tunneling protocols, path reservation protocols, connectivity verification protocols, and so on. Generally, computer network operating systems function on various classes of network platforms. Such platforms include routers, switches (e.g., ATM switches, LAN and WAN switches, etc.), file servers, intelligent hubs, personal computers, and any other devices that function within an internetwork.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an operating system on a computer device interfaces with a graph database that has data nodes interconnected by relationship edges. The operating system generates database instructions that specify a database operation for a target node in the graph database and a node traversal list through the graph database to reach the target node. By then transmitting the database instruction to the graph database, the graph database (e.g., a database management operating system) traverses the specified node traversal list through the graph database to the target node, and performs the database operation on the target node.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
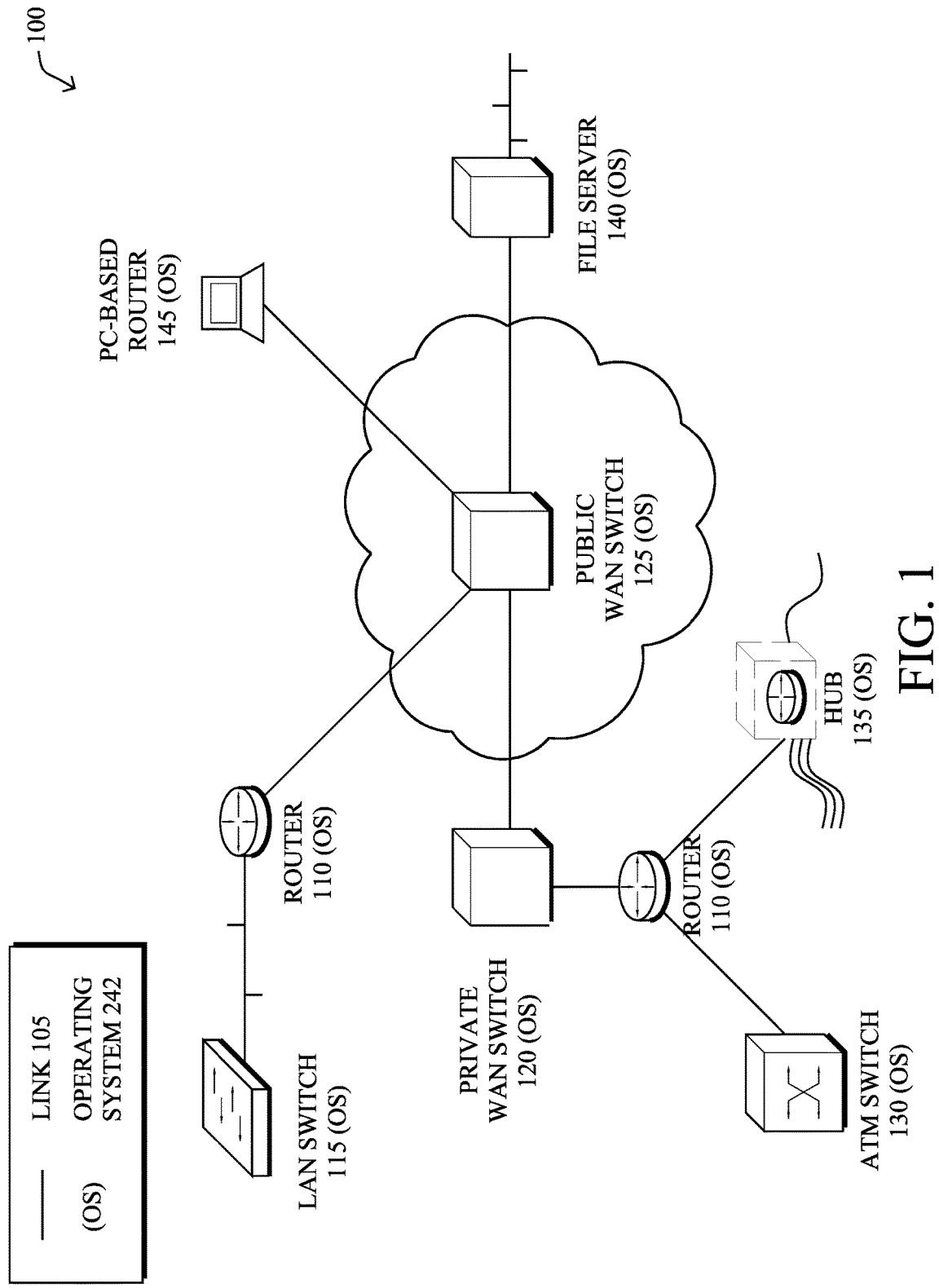
FIG. 1 illustrates an example communication network.

FIG. 1 is a schematic block diagram of an example computer network 100 illustratively comprising nodes/devices, such as a plurality of routers, switches, and so on interconnected by links 105 or networks, as shown. For instance, such devices may illustratively comprise routers 110, LAN switches 115, private WAN switches 120, public WAN switches 125, ATM switches 130, hubs 135, file servers 140, PC-based routers 145, etc. Notably, each device may have an operating system (OS) 242, as described below.

Data packets (e.g., traffic/messages) may be exchanged among the nodes/devices of the computer network over links 105 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. The links themselves may be wired links, wireless links, powerline communication links, and so on. Those skilled in the art will understand that any number of nodes, devices, links, etc. may be used in a computer network, and that the view shown herein is for simplicity.

Figure 2:
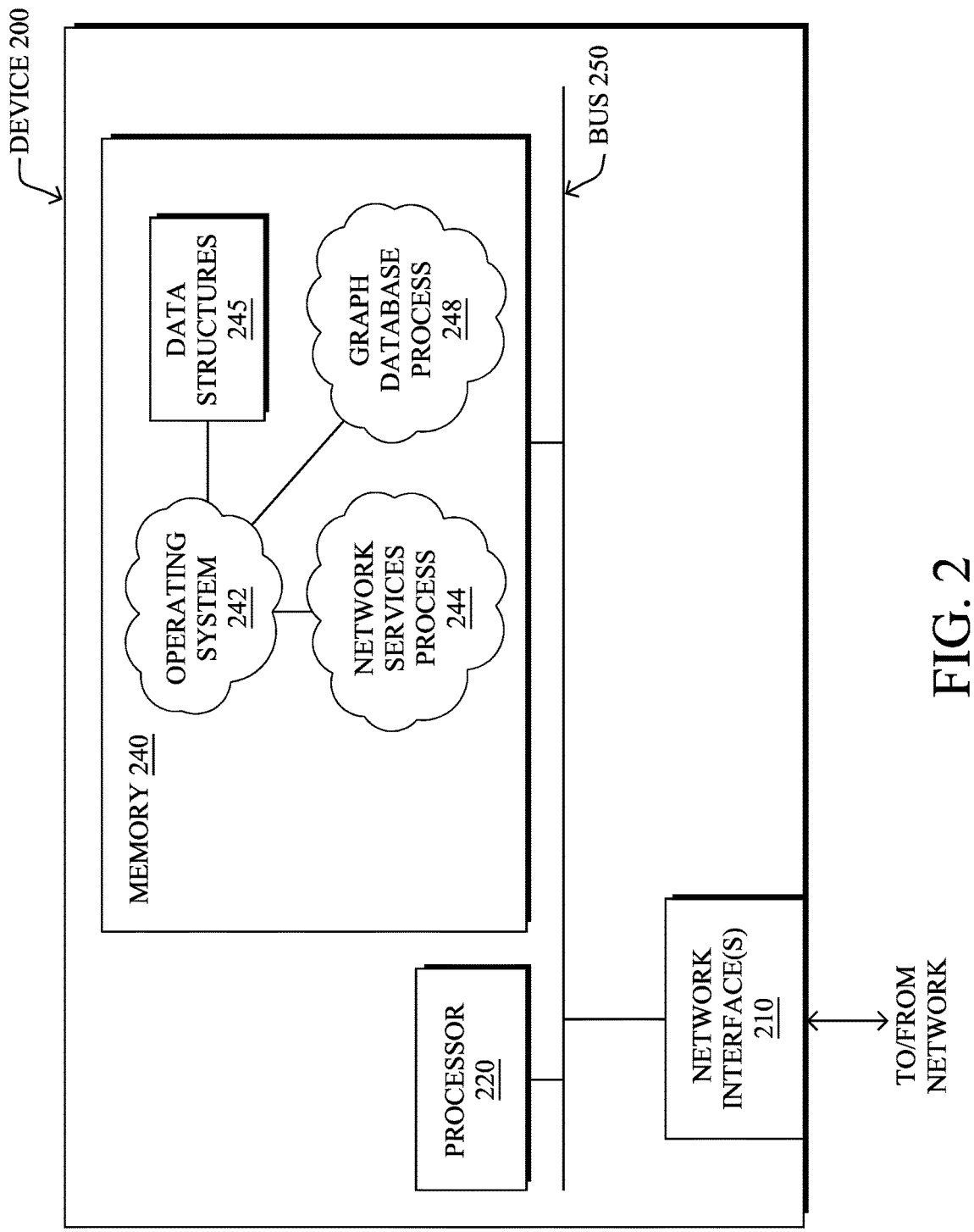
FIG. 2 illustrates an example computing device.

FIG. 2 is a schematic block diagram of an example node/device 200 that may be used with one or more embodiments described herein, e.g., as any of the devices of network 100, or any other computing device that may perform the operating system techniques described herein (e.g., routers, switches, etc.). Device 200 comprises a one or more network interfaces 210, one or more processors 220, and a memory 240 interconnected by a system bus 250.

The network interface(s) 210 contain the mechanical, electrical, and signaling circuitry for communicating data over links coupled to the network 100. The network interfaces may be configured to transmit and/or receive data using a variety of different communication protocols. Note that the nodes may have multiple types of network connections 210, e.g., wireless and wired/physical connections, and that the view herein is merely for illustration.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the device by, among other things, invoking operations in support of software processes and/or services executing on the device. These software processes and/or services may include one or more network service processes 244, such as routing processes, switching processes, traffic engineering processes, security processes, and so on, any of which optionally being alternatively located within individual network interfaces. An illustrative "graph database" process 248 may also be present on the device 200, the functionality of which being detailed further below.

Note that while dynamic processes are shown in centralized memory 240, alternative embodiments provide for the process to be specifically operated within the operating system 242, or within network interfaces 210. It will also be apparent to those skilled in the art that other processor and memory types, including various computer-readable media, may be used to store and execute program instructions pertaining to the techniques described herein. Further, while the description illustrates various processes, it is expressly contemplated that various processes may be embodied as modules configured to operate in accordance with the techniques herein (e.g., according to the functionality of a similar process). Moreover, while the processes have been shown separately, those skilled in the art will appreciate that processes may be routines or modules within other processes.

As an illustrative example of a network service process 244, a routing process may include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Other types of functional processes may be used by the device 200, and a routing process is merely one example that is not meant to be limiting to the embodiments herein.

—Efficient Graph Database Traversal—

A database provides a structured way of storing information. In a graph database, the states are represented in atomic units known as nodes and the nodes are organized in the form of a graph. This is to say, there can be a direct reference from a node to another node. Sometimes a node can reference a 'container' which contains many other nodes. Examples of a container are an array, a link-list or even a key lookup structure (AVL, RB, hash tree) etc.

Figure 3:
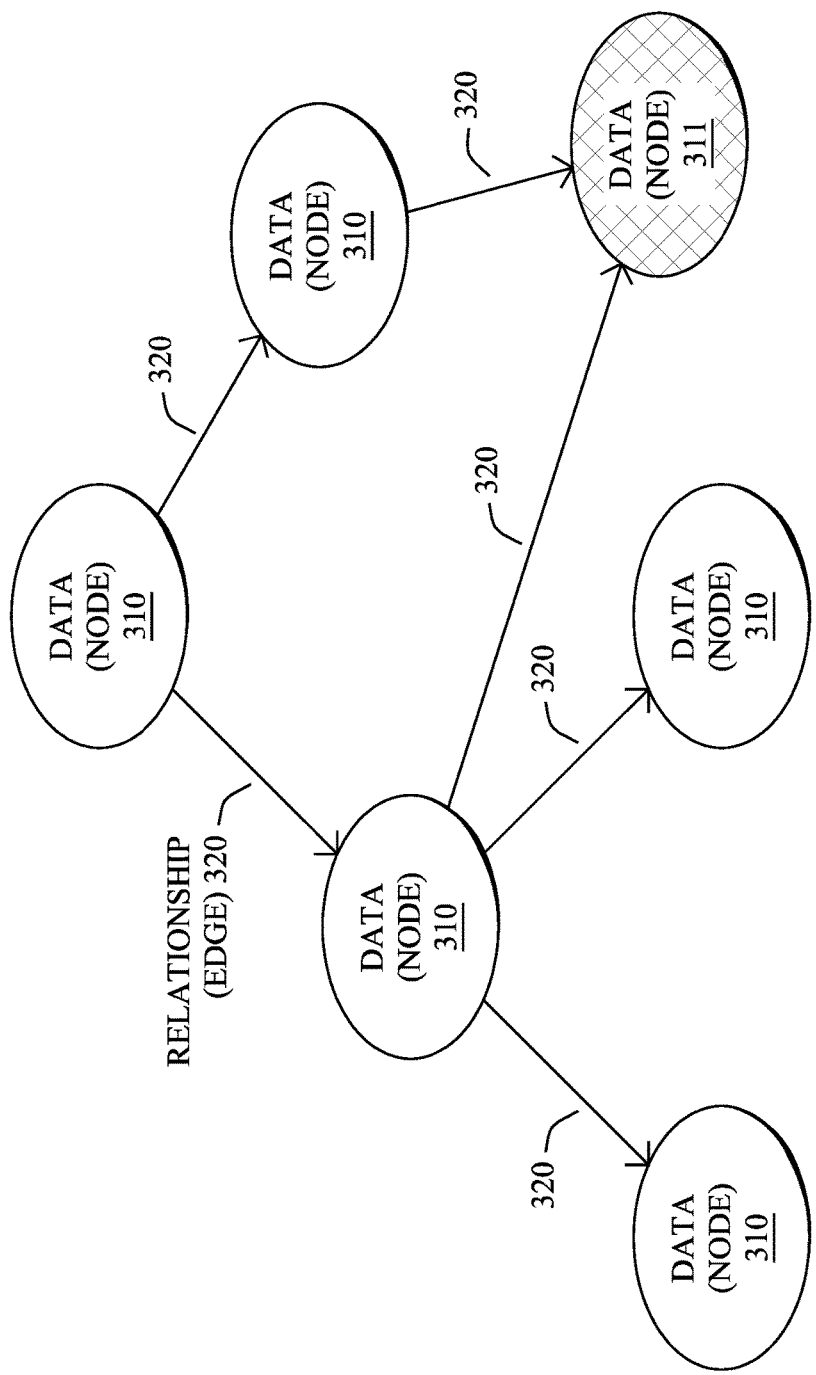
FIG. 3 illustrates an example graph database.

Said differently, a graph database stores data in the form of "nodes" that are interconnected via "edges" that define the relationship between them. Nodes contain information about different objects stored in the database and the edges can be used to travel from one node to another based on certain criteria. FIG. 3 illustrates an example graph database 300, where data (nodes) 310 are interconnected via relationships (edges) 320. In a distributed graph database, the data 310 may be maintained locally on the device executing an application, or else on a different (e.g., remote) device, such as, for example, data node 311, which may be a reference to an object stored or maintained by a different application or device.

The use of graph databases in the context of a computer networking system, for example, involves the storage of configuration and operational states on the system. The networking system (NS) here can either refer to physical device that performs the control and/or dataplane forwarding function or virtualized system that runs in a cloud environment. The graph databases in the NS need to be accessed in a programmatic manner. For instance, one path of such accesses is from various northbound manageability agents (CLI, SNMP, WEBUI, etc.). Therefore it typically makes sense to split the DB access framework into a front-end and a back-end portion, where the front-end is collocated with the entity performing the query and the back-end collocated with the actual datastore and serves the query.

Figure 4:
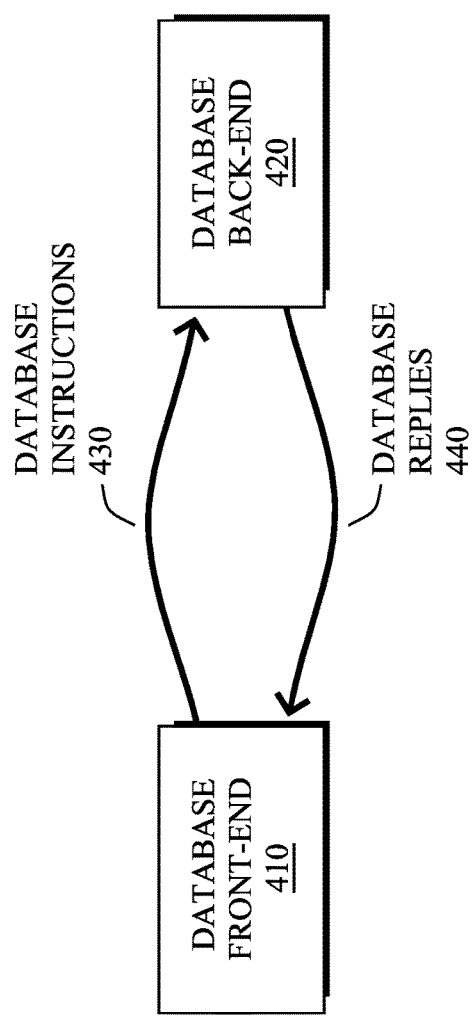
FIG. 4 illustrates an example of a database front-end and back-end.

FIG. 4 illustrates a simplified example of a high-level database architecture 400 with a front-end 410 and back-end 420. The database front-end 410 offers a user programming interface to translate input parameters to database instructions 430, which in turn exercise the database back-end 420 (e.g., an execution engine with the capability to interpret database instructions). Database replies 440 (e.g., data for queries, acknowledgment for actions taken, etc.) may then be returned based on the database access.

Notably, the front-end access to the back-end can be local or remote. Remote access could mean from one process to another process running on the same FRU (field replaceable unit), from one process to another process on different FRUs, or across different boxes. Remote access could also mean from one virtualized system to another virtualized system, or from a virtualized 'brain' to a physical device.

To build an increasingly bigger and distributed system, as well as to ensure the highest level of manageability and serviceability, it is paramount that 'data' from a networking system be available to a networking management function as effortlessly as possible. The techniques herein, therefore are directed toward making states in the graph database (e.g., on the NS) be accessed with as little effort as possible.

In particular, the techniques herein change database operations (queries and replies) within a location-independent graph-based database from lengthy and cumbersome string-based operations to simplified binary-encoded operations, where the query and the reply can be exchanged using a combination of binary-encoded operation codes, node traversal lists, and parameters/filters, allowing for rapid navigation of the databases. In particular, the binary-coded directed traversal of nodes in the database allows the system herein to expresses how to reach one object from another object.

Specifically, according to one or more embodiments described in greater detail below, an operating system on a computer device interfaces with a graph database that has data nodes interconnected by relationship edges. The operating system generates database instructions that specify a database operation for a target node in the graph database and a node traversal list through the graph database to reach the target node. By then transmitting the database instruction to the graph database, the graph database (e.g., a database management operating system) traverses the specified node traversal list through the graph database to the target node, and performs the database operation on the target node.

Illustratively, the techniques described herein may be performed by hardware, software, and/or firmware, such as within and/or through coordination with the operating system 242, particularly the graph database process 248, which may contain computer executable instructions executed by the processor 220 to perform functions relating to the techniques described herein. Note that while reference is made to functionality within the operating system 242, portions of the techniques described herein may be performed by any combination of various processes and applications, and it is also expressly contemplated that various processes may be embodied as modules configured to operate in accordance with the techniques herein (e.g., according to the functionality of a similar process). Further, while processes may have been shown separately, those skilled in the art will appreciate that processes may be routines or modules within other processes (e.g., part of operating system 242).

As noted above, current techniques offer a structured interface, but are expensive at run time due to the need to perform path validation on a string (e.g., uniform resource identifier, URI). Also the use of string literals means that there are many heavy string operations involved in the implementation. The techniques herein, on the other hand, use a very different design and implementation approach. The techniques herein (which may be collectively referred to as "GREEN" (GRaph database Execution ENgine)) do not lose functionality in the sense of offering a structured interface, strongly typed, and being in-service software upgrade (ISSU) capable. At the same time, the techniques herein offer unmatched performance at protocol scale.

Figure 5:
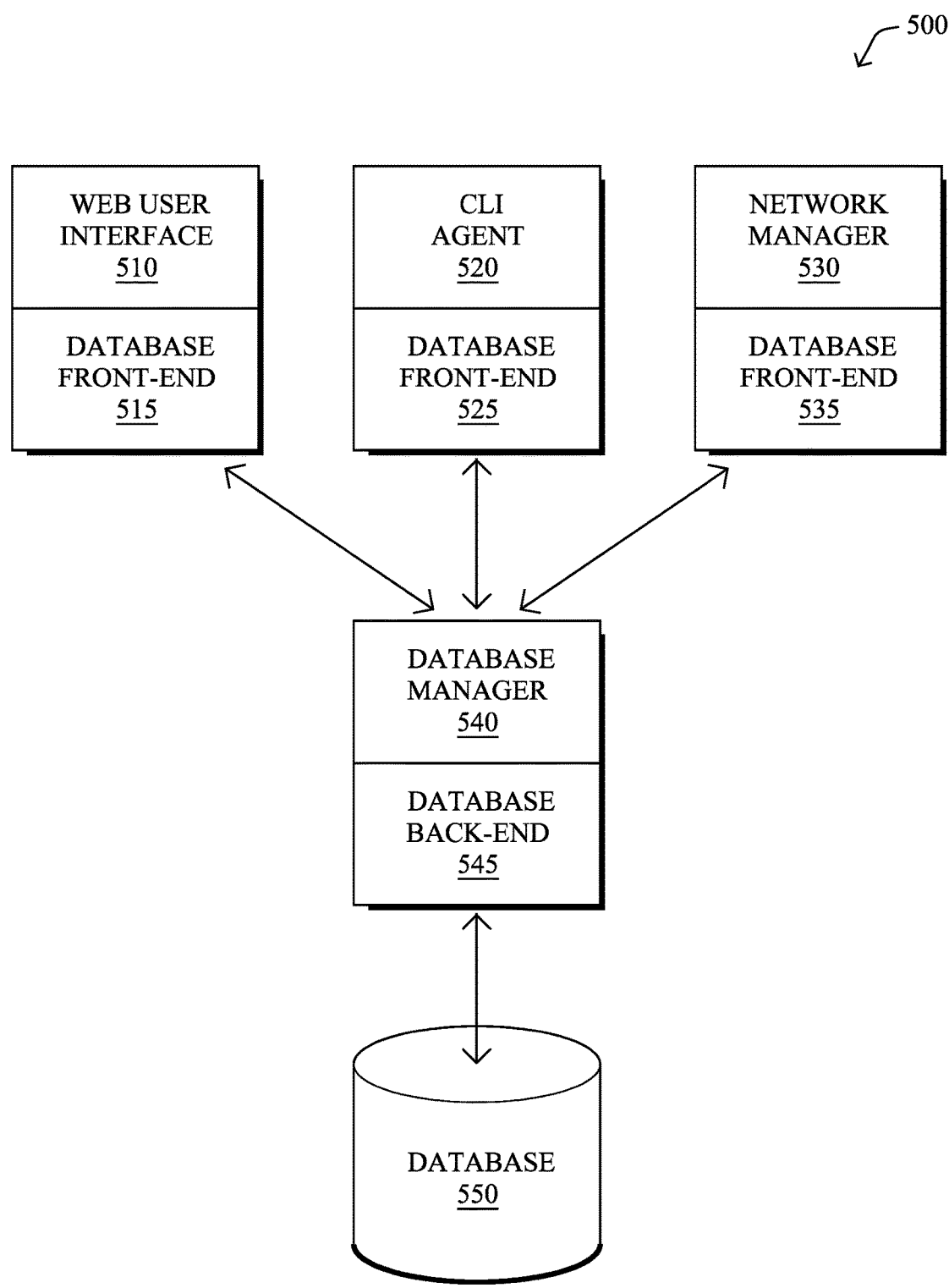
FIG. 5 illustrates an example database logical architecture.

FIG. 5 illustrates a high-level representation of an example database logical architecture 500. The database front-ends 515, 525, and 535 (collectively 410 above) are illustratively run as libraries within a web user interface (e.g., WebUI) agent 510, a CLI-agent process 520, as well as a network manager process (e.g., distributed networking operating system) 530, respectively. The database back-end 545 (420 above) illustratively runs as a library within the database manager (DBM) process 540 interacting with the database 550.

As described in detail below, the techniques herein involve the following features:

1. A binary encoded traversal specification of a graph database (e.g., used for computer networking applications);
2. A binary encoded specification of the returned results in the case of a query operation; and
3. A way to synthesize from the declared data model (in this case TDL data model) custom APIs that omit the need for the input of the URI and obtain the query parameters in their native form.

—Part 1)—

According to the techniques herein, the binary encoded traversal specification (or "traversal list" herein) may be constructed by the database front-end 410 and executed by the database back-end 420. Notably, both the front-end and back-end has knowledge to the database schema, and thus they both come to the same interpretation.

Figure 6:
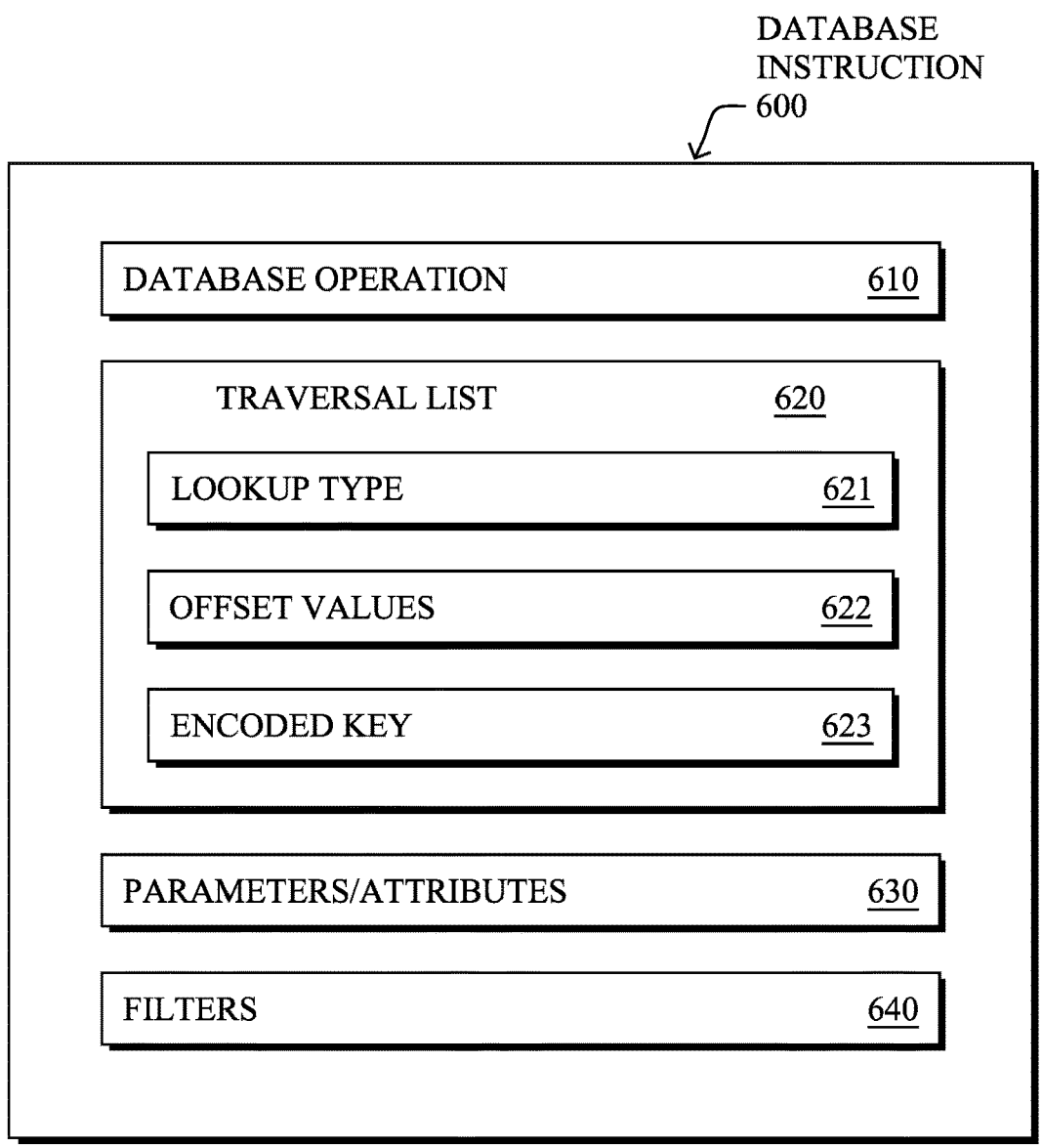
FIG. 6 illustrates an example database instruction.

With reference to FIG. 6, a database instruction 600 is shown that carries the binary encoded traversal specification as described herein. In particular, what is carried in the database instruction are:

a. A specification of the operation 610 (e.g., SET, DELETE, GET, GET_CHANGES, GET_FIRST, GET_NEXT, and many others). In general, database operations are queries (such as determining what a record is, if there's a record, how many records there are, etc.) or updates (setting a value, deleting a value, creating a table, etc.).

b. A traversal list 620 carrying a specification of the list of nodes to be visited through the graph to the destination (target) node. Each of the embedded traversal entries carries with it: I) a type of the lookup (621); II) an array of vectors which each specify an offset value (622) at each level of the intra-node query such that the navigation can navigates through multiple level attributes within a node; and III) an optional binary encoded key value (623) if the lookup is a keyed lookup (e.g., query_def) which involves launching a search into a lookup structure (e.g., AVL, red-black (RB) tree, hash, etc.). The outcome of a traversal list evaluation is the yielding of a target node that is to be operated on (e.g., via a set of path_def and query_def definitions, such as a traversal through a three level table being represented as P1:Q1/P2:Q2/P3:Q3).

c. An optional list of database parameters (630) each specifying the individual attributes within the target node to be operated (i.e., updated or queried). The encoding scheme that is used is similar to that of the traversal specification. For example, assume an application is dealing with an execution context of a "school", and the operation is to set values for a "student" node. The operation may, in fact, set the name, student ID, and major subject name of the student, if the student node is a table or list. Note that there are three illustrative operations that can be performed on a particular attribute: Regular SET (set the record attribute to the specified value); SET default (revert the value of the attribute back to its default value); and UNSET (mark the attribute specific unset bit).

d. An optional list of filter parameters (640) which carries the binary filter specification of the filter to be operated with the specified database operation. For instance, the techniques herein offer the ability to perform close-to-the-source filtering based on fine grain leaf record attribute values. Filtering can be enabled for bulk query operations (e.g., get_n) or with the monitor/subscription (e.g., get_changes) functionality mentioned previously to greatly increase the relevance of the queried results by performing filtering in the database back-end. Example filters may be based on algebraic relations (e.g., equal to, not equal to, greater than, less than, greater than or equal to, less than or equal to, etc.), or other filters (e.g., starts with, ends with, contains, has value, etc.). The list of attributes and their specified values are used as the filtering criteria, and as such, a record with an attribute having a value that matches the specified filter is deemed a match upon which the operation is to be performed.

Figure 7:
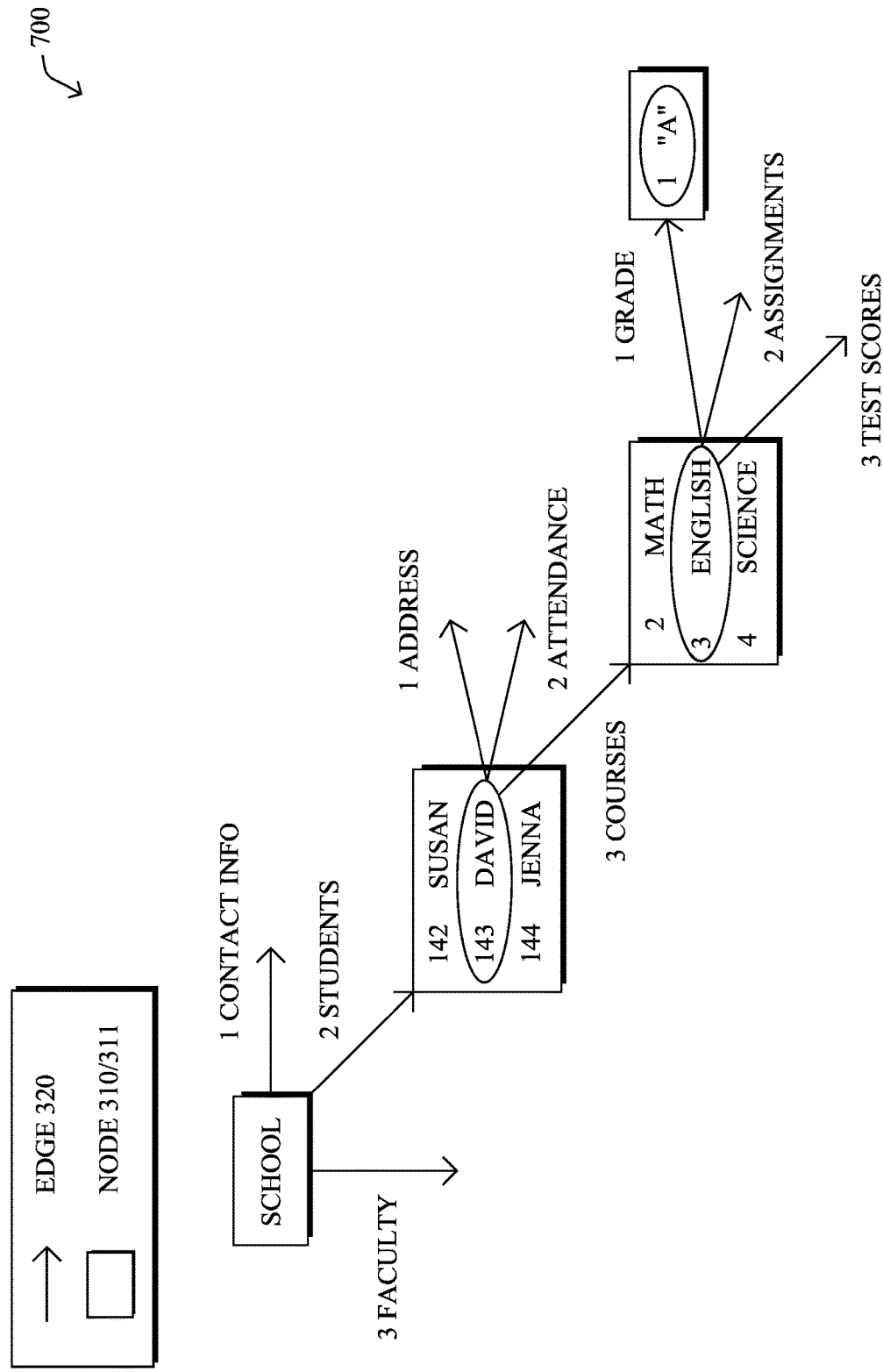
FIG. 7 illustrates an example of database traversal visualization.

FIG. 7 illustrates an example of database traversal visualization 700, where the database illustratively models an example school database system. Assume, for instance, that a particular school has a database (e.g., the root of the database is the school), and within this graph database data corresponding to students, faculty, contact information, etc. If a database front end desires to perform an operation that queries a certain student's (e.g., "David's") English course grade. According to the techniques herein, therefore, rather than entering a URI-based query for "David's English course grade", which would require parsing, interpretation, formatting validation, and so on, the techniques herein would allow the traversal list to be defined by the head-end as follows:

Illustrative binary form: 2:143/3:4/1:1.

Human-readable meaning: Students:David/Courses:English/Grade:Value.

In particular, the binary code provides a path "2" which means "students" (as opposed to contact info, faculty, etc.), a student query (into the list of students) for record 143 (referring to David), and then a path from David to his courses (path "3", as opposed to his address, his attendance, and so on), and the fourth listed course (i.e., English), and then the first path (grades, as opposed to assignments, individual test scores, etc.) and the value (e.g., a single record entry, not a table/list). Based on the database instruction 600 carrying this traversal list 620, a particular operation 610 may thus be performed on this target node (David's English grade), such as a query (i.e., what is his grade?), or an update (e.g., set his grade to an "A").

Note that a group of these database instructions can be batched and issued from the front-end to the backend. Each batch translates to a single database transaction, e.g., they may be applied "all or nothing". (For example, multiple grades can be set.)

Note also that database instructions work across an ISSU boundary. That is, with the versioning framework that TDL provides, a down-ref front-end sending to an up-ref back-end is guaranteed by the TDL extension model not to send something to the back-end that it will not understand. Similarly an up-rev front-end sending to a down-rev back-end detects and triggers an EPOCH error to the application and omits the field from the output stream. This guarantees that an incapable recipient never has to handle an instruction with offset that it does not understand.

In addition to a pulled query, a database instruction herein can also place a subscription on a data entry (object, table, etc.) for its incremental change sets to be sent (e.g., streamed) to an external monitoring agent. There can be subscription specific threshold or filtering constraints that can be placed with the subscription. The filters again are encoded, carried from the front-end, and executed in the backend in binary form, ensuring maximum performance efficiency. In other words, the techniques herein allow for the specification of subscription specific parameters and filters, as well as the execution of the filter in binary on a high-flux networking graph database. This push model greatly increases the efficiency of the data transfer as only changes are pushed to the requestor.

For example, the techniques herein would allow a system to get notified whenever a student gets suspended or takes a leave of absence. By performing a GET_CHANGES operation on the student table specifying a filtering criteria on the student status, then whenever a student record is inserted into the student table with a status of "SUSPENDED" or "LOA", or an existing student record status is changed to "SUSPENDED" or LOA", the student record will be pushed to the requestor. (Notably, if one wanted to perform a query to retrieve all the students who have been suspended or taken a leave of absence, they can run get_n operations on the student table with the same filtering criteria: only records of suspended students or those taking a leave of absence will be returned with the get_n.)

The pseudo-code below illustrates an example of what a binary encoding may look like, where the "green_params" structure can be marshaled and sent on the wire from the front-end to the back-end (recall that the database engines herein may be referred to as GREEN (GRaph database Execution ENgine)):

```
-enum_def green_params_op {
-GREEN_PARAMS_OP_SET, /* Set rec field without create */
-GREEN_PARAMS_OP_SET_NO_CREATE,/* Set rec field, create if not present */
-GREEN_PARAMS_OP_GET, /* Get rec given key */
-GREEN_PARAMS_OP_GET_NEXT, /* Get next rec given primary key */
-GREEN_PARAMS_OP_GET_PREV, /* Get previous rec given primary key */
-GREEN_PARAMS_OP_GET_N, /* Get N rec given primary key or collection URI */
-GREEN_PARAMS_OP_GET_COUNT, /* Get number of records in table */
-GREEN_PARAMS_OP_DOES_EXIST, /* Test if rec exist given key */
-GREEN_PARAMS_OP_DELETE_REC, /* Delete rec if found given key */
-GREEN_PARAMS_OP_DELETE_REC_RECURSIVE, /* Recursively delete rec if found given key */
-GREEN_PARAMS_OP_GET_CHANGES, /* Start getting changes on a table */
-GREEN_PARAMS_OP_STOP_CHANGES, /* Stop receiving the changes on a table */
-GREEN_PARAMS_OP_GET_N_RECURSIVE, /* GET N for nested tables */
-}
-enum_def green_param_op {
-GREEN_OP_SET,
-GREEN_OP_SET_DEFAULT,
-GREEN_OP_GET,
-}
```

```
-type_def green_id {
-u_int8 type_luid[TDL_LUID_LEN];
-u_int32 field_id;
-}
-type_def green_param {
-list_embed green_params;
-list_embed green_entry;
-u_int32 vec_cnt;
-green_id green_id_vec[vec_cnt];
-green_param_op param_op;
-u_int8 param_luid[TDL_LUID_LEN];
-u_int32 param_len;
-u_int8 param_data[param_len];
-}
-enum_def green_pq {
-GREEN_PATH_DEF,
-GREEN_QUERY_DEF,
-GREEN_PATH_DEF_SELF,
-GREEN_QUERY_DEF_WILDCARD, /* Internal only */
-}
-type_def green_traverse {
-list_embed green_params;
-green_pq pq;
-/* path/query definition deref */
-green_id deref_table;
-/* obja path for path/query field deref */
-u_int32 vec_cnt;
-green_id green_id vec[vec_cnt];
-/* query definition lookup */
-u_int8 key_luid[TDL_LUID_LEN];
-u_int32 key_len;
-u_int8 key_data[key_len];
-u_int32 key_field_id;
-}
-type_def green_params {
-green_params_op params_op;
-list green_traverse;
-list green_param;
-list green_filter;
-u_int32 num; /* For GET_N, this is non-zero */
-green_cursor cursor; /* Cursor for GET_N */
-}
```

Below, also, is an example rendered user-readable snapshot of the database bytecode for the above example.

```
-list t count 2
-Traverse 1
-vec count 0
-pq luid (null)
-deref_table field 0, name table tbl_ApfVap
-Traverse 2
-vec count 0
-pq luid (null)
-deref_table field 0, name (null)
-key len 10, type tdl_vstring
-list p count 5
-Param 1
-vec count 2
-vec 0, field 0, name type wcm_ApfVap
-vec 1, field 2, name type tdl_vstring
-data len 10, type tdl_vstring
-Param 2
-vec count 2
-vec 0, field 0, name type wcm_ApfVap
-vec 1, field 1, name (null)
-data len 4, (null)
-Param 3
-vec count 3
-vec 0, field 0, name type wcm_ApfVap
-vec 1, field 162, name type apfVapDataConfigFileV2
-vec 2, field 1, name type tdl_vstring
-data len 10, type tdl_vstring
-Param 4
-vec count 3
-vec 0, field 0, name type wcm_ApfVap
```

-continued

```
-vec 1, field 162, name type apfVapDataConfigFileV2
-vec 2, field 10, name type tdl_vstring
-data len 7, type tdl_vstring
-Param 5
-vec count 3
-vec 0, field 0, name type wcm_ApfVap
-vec 1, field 162, name type apfVapDataConfigFileV2
-vec 2, field 18, name type tdl_vstring
-data len 21, type tdl_vstring
```

—Part 2—

Similar to the traversal, the responses themselves may be binary encoded. The query specifies the kind of encoding, i.e., partial or full. The partial encoding uses the same encoding scheme to carry the partial record from the backend to the frontend. The full encoding marshals the entire record with type/value specification and carries that from the backend to the frontend. (Note that the same versioning capability provided by TDL that is available to the queries is available to response handling, as well.) As an example, in the case of the SET operation, the response will simply carry the result code of the operation. But in the case of the GET, the response can carry the record data itself. In other words, a reply from the database may have the node traversal list to indicate the and/or confirm the target node, along with one or more associated data values (or acknowledgment) from the target node.

—Part 3)—

To further improve performance, at the enabling of a granular build time knob, the techniques herein generate a custom high-performance interface for executing a query from the front-end. This variance of the front-end is known as the native database front-end. The knob is enabled using add-on specifications to the basic data model specifications. Note that this build time generated custom interface to a graph database query knob, in the illustrative "GREEN" terminology, is known as "green_operation_def".

For the example quoted above, the generated interface will look like this:

green_result_code_e_t
wcm_apfvap_get (tdlhandle_t h, tid_t t, char*serviceName, char*profileName, green_params_t*params);

Applications use these application programming interfaces (APIs) to directly pass in the query parameters. Note that in the case where the parameter is not a string (e.g., integer), then the function prototype takes the integer type directly. Also the traversal path itself is implied in the API, hence there is no need for a specified URI. The output of the function is a pointer to a database parameter structure (e.g., green_param struct), which can be directly sent to the backend. The same logical equivalent operation can be performed on the return path on the response to a custom generated user callback.

Figure 8:
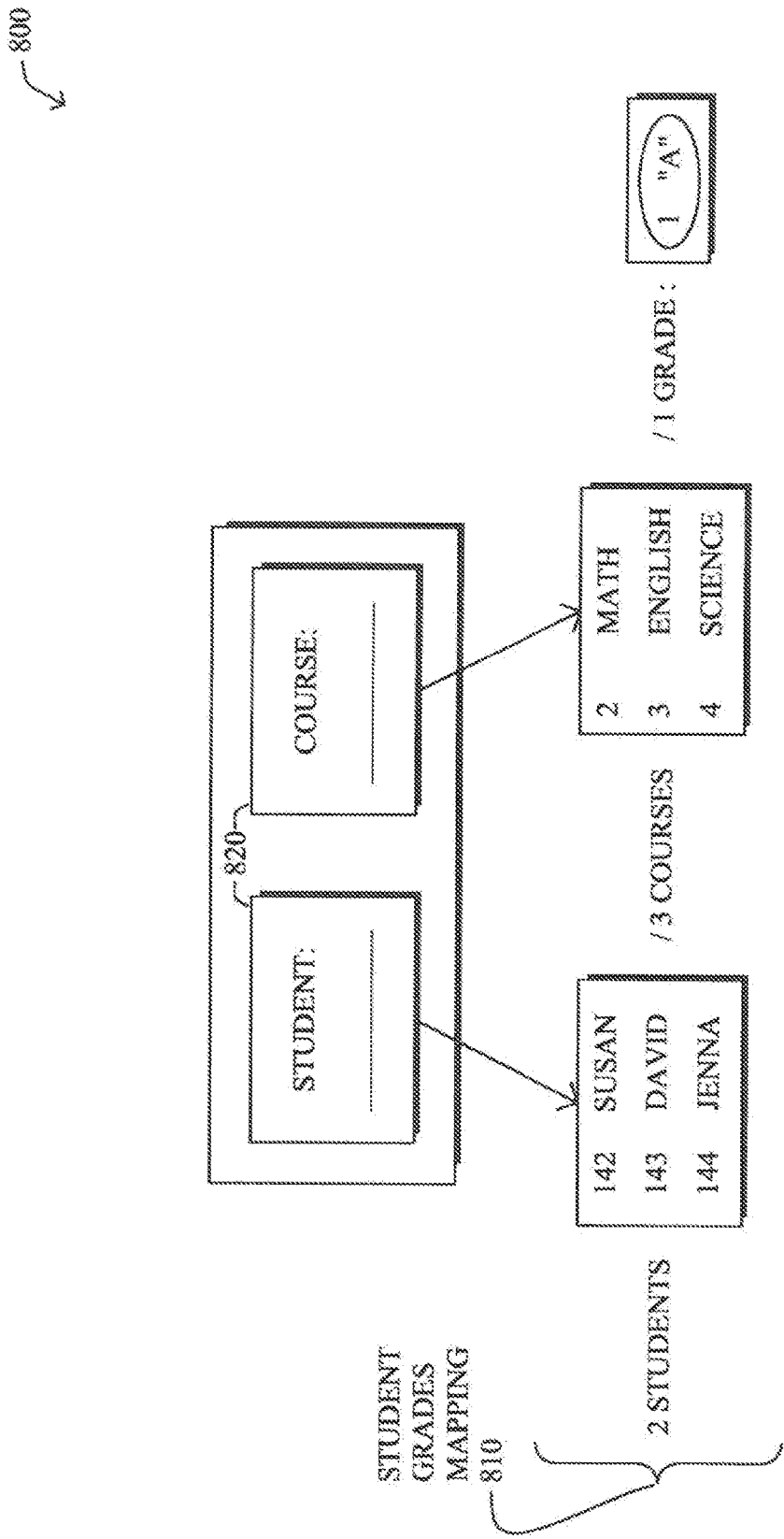
FIG. 8 illustrates an example interface.

FIG. 8 illustrates an example visualization of an interface (e.g., an API) provided and configured to receive parameters and convert the parameters into database instructions as mentioned above. For instance, using the example above in FIG. 7, various APIs may be created to reach particular target nodes, such as student grades. To perform such a traversal (e.g., for queries), an interface 800 may provide a mapping 810 with a specific node traversal list/path, having various query blanks 820 that the interface would need filled in. For example, to obtain any particular student's grade in a particular subject, the mapping 810 for obtaining grades may comprise:

Illustrative binary form: 2:_____/3:_____/1:1.
Human-readable meaning: Students:_____/Courses:_____/Grade:Value.

In the above example, the "_____" indicates the information requested by the interface in order to complete the specific query, such as "David" and "English" to complete the query mentioned in FIG. 7 above. The interface 800 would then know to convert "David" to the appropriate entry (e.g., 143) and "English" to the appropriate entry (e.g., 3) to complete the database instruction 600 according to the expected formatting as described herein. Any number of useful interface arrangements may be made, such as for querying different information, setting information, obtaining lists (e.g., "what courses is student X taking?"), performing batches (e.g., "return the Math scores for students X, Y, and Z"), and so on.

Figure 9A:
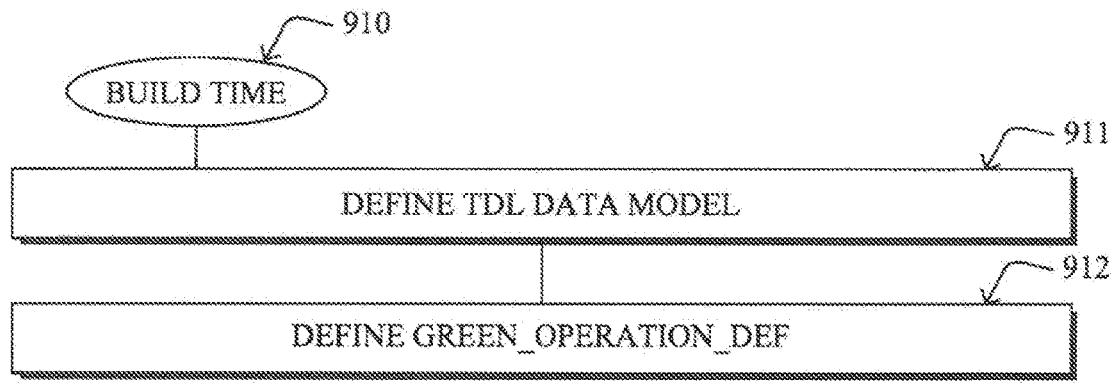
FIGS. 9A-9B illustrate example build time and run time processes for enabling efficient graph database traversal.
Figure 9B:
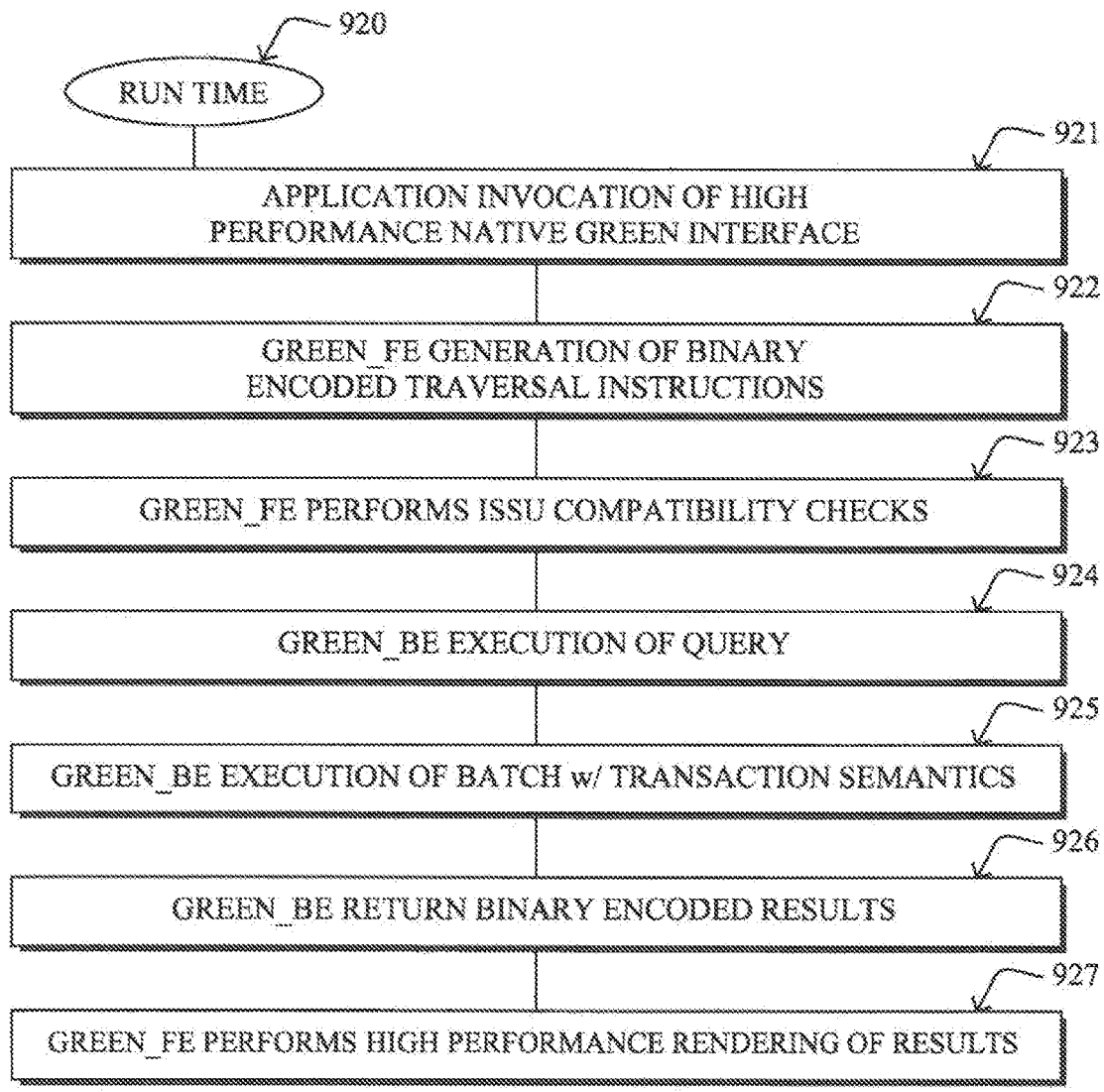

FIGS. 9A-9B illustrate example simplified build time and run time processes for enabling efficient graph database traversal (e.g., a high performance GREEN query). For instance, in FIG. 9A, the build time process 910 comprises defining the TDL data model (911) and defining the green_operation_def (912) as detailed above. The run time process 920 of FIG. 9B on the other hand comprises application invocation of high performance native green interface (921), GREEN_FE generation of binary encoded traversal instructions (922), GREEN_FE performing ISSU compatibility checks (923), GREEN_BE execution of query (924), GREEN_BE execution of batch with transaction semantics (925), GREEN_BE returning binary encoded results (926), and GREEN_FE performing high performance rendering of results (927).

Figure 10:
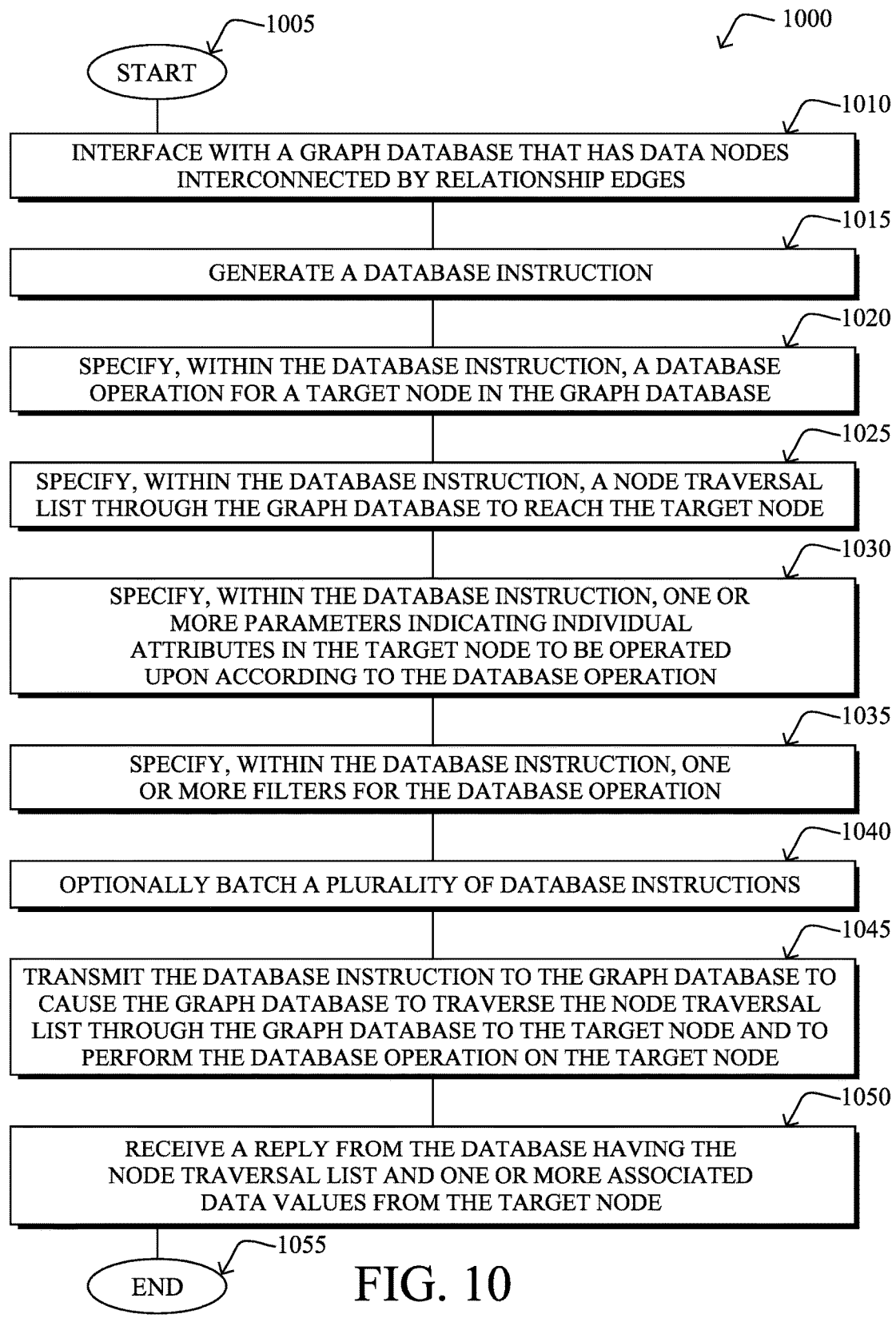
FIG. 10 illustrates an example simplified procedure for efficient graph database traversal, particularly from the perspective of the database front-end.

In addition, FIG. 10 illustrates an example simplified procedure for efficient graph database traversal in accordance with one or more embodiments described herein, particularly from the perspective of the database front-end. The procedure 1000 may start at step 1005, and continues to step 1010, where, as described in greater detail above, an operating system 242 on a computer device (as front-end 410) interfaces with a graph database 300 that has data nodes 310/311 interconnected by relationship edges 320. Note that in one embodiment as described above, the interface may be a provided application programming interface (API) that is configured to receive parameters and convert the parameters into the database instruction.

In step 1015, the operating system may generate a database instruction 600 (e.g., binary encoded), and may specify, within the database instruction, a database operation 610 for a target node in the graph database in step 1020. As mentioned above, the database operation may be any number of query operations or update operations, and may include subscribing to receive updates performed to the target node. In step 1025, the operating system also specifies, within the database instruction, a node traversal list 620 through the graph database to reach the target node, where, as described above, the node traversal list may comprise offset values 622 pointing from each traversed node to each subsequent node of the graph database (e.g., path/query lists, integer vectors/arrays, etc.). Notably, as mentioned above, the node traversal list may also comprise an encoded key 623 for each of one or more encoded data nodes in the node traversal list, accordingly.

Optionally, in step 1030, the database instruction may also specify one or more parameters 630 indicating individual attributes in the target node to be operated upon according to the database operation, and/or one or more filters 640 for the database operation in step 1035, as described above. Also, in step 1040, a plurality of database instructions may optionally be batched together into a single instruction.

In step 1045, the operating system (database front-end 410) may transmit the database instruction 600 to the graph database (database back-end 420) to cause the graph database to traverse the node traversal list through the graph database to the target node and to perform the database operation on the target node. Depending on the operation, in step 1050 a reply may be received from the database having the node traversal list and one or more associated data values (or acknowledgements) from the target node. The illustrative simplified procedure 1000 may then end in step 1055.

Figure 11:
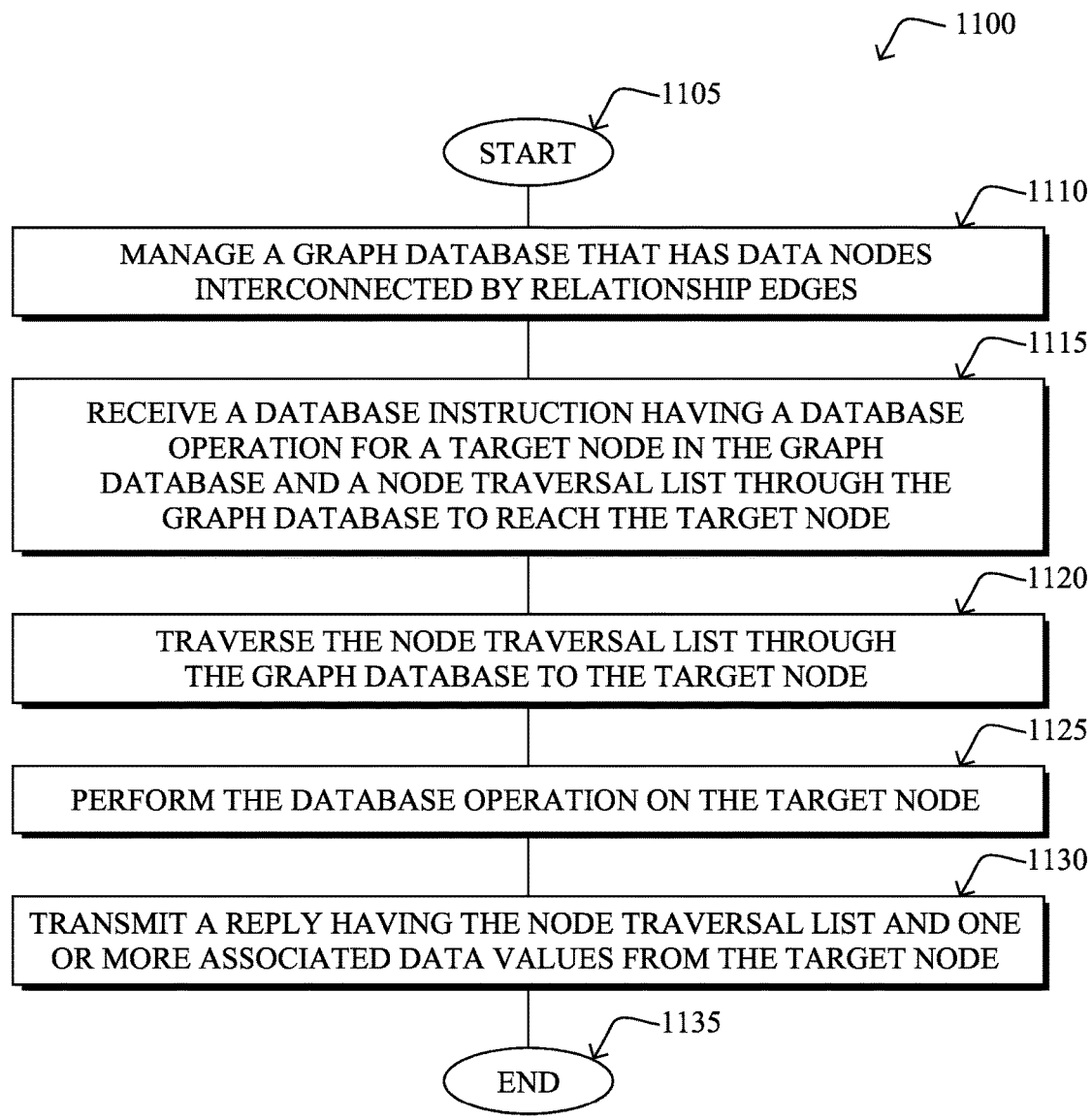
FIG. 11 illustrates an example simplified procedure for efficient graph database traversal, particularly from the perspective of the database back-end.

Moreover, FIG. 11 illustrates an example simplified procedure for efficient graph database traversal in accordance with one or more embodiments described herein, particularly from the perspective of the database back-end. The procedure 1100 may start at step 1105, and continues to step 1110, where, as described in greater detail above, an operating system on a computer device (as back-end 420) manages a graph database that has data nodes interconnected by relationship edges, and receives a database instruction in step 1115 having a database operation for a target node in the graph database and a node traversal list through the graph database to reach the target node. Accordingly, the back-end operating system traverses the node traversal list through the graph database to the target node in step 1120, and performs the database operation on the target node in step 1125. Again, depending upon the operation, in step 1130 a reply may be transmitted to the database front-end that has the node traversal list and one or more associated data values (or acknowledgments) from the target node. The illustrative simplified procedure 1100 may then end in step 1135.

It should be noted that while certain steps within procedures 1000-1100 may be optional as described above, the steps shown in FIGS. 10-11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1000-1100 are described separately, certain steps from each procedure may be incorporated into each other procedure, and the procedures are not meant to be mutually exclusive. Still further, the terms "specify", "specifies", and "specifying" as used herein may include any type of action relating to identifying, evaluating, designating, naming, and so on.

Figure 12:
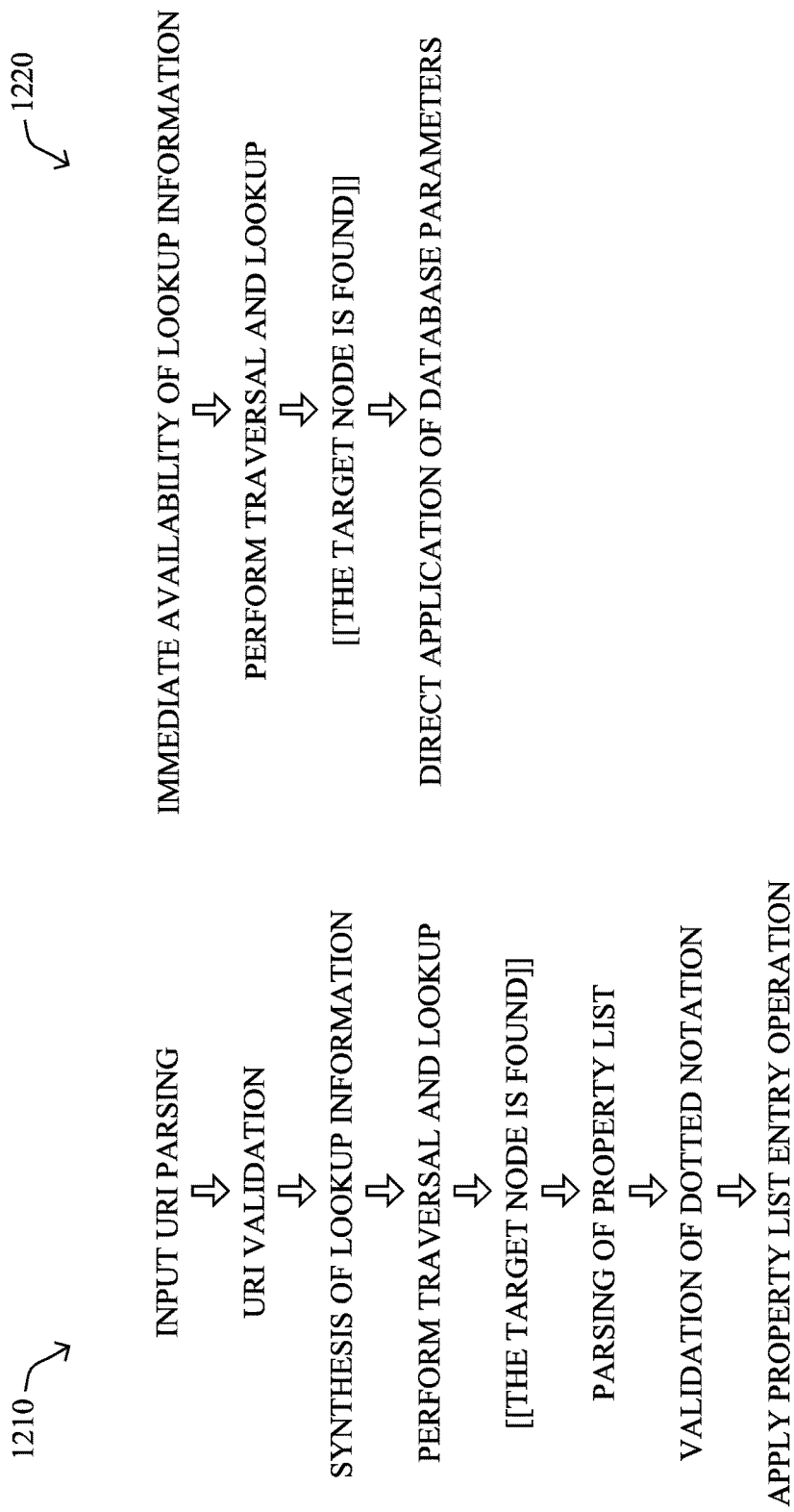
FIG. 12 illustrates an example comparison of database processing flows.

The techniques described herein, therefore, provide for efficient graph database traversal. In particular, the techniques herein perform significantly faster than the current technologies in terms of the execution speed which translates to the number of records queried per second. For example, with reference to FIG. 12, the flow 1210 of a current system that uses URIs is compared to flow 1220 of the graph database system described above. Specifically, in flow 1210, the system first parses the input URI, then validates it, then performs a synthesis of lookup information, and then performs the graph traversal and lookup. Similarly once the target node is found, then the database back-end parses the property list, validates a dotted notation (e.g., format and content), then applies the property list entry operation. On the other hand, according to the techniques herein, a native database front-end process flow 1220 provides immediate availability of lookup information, leading directly to performing traversal and lookup. Then, once the target node is found, there can be a direct application of database parameters. Overall, the techniques herein cut the overhead of:

Parsing of strings (in the URI-based implementation, this involves a lot of resource allocation and manipulation of temporary structures);
Runtime validations and string compares;
Type conversions; and
Overall amount of information transferred between the front-end and back-end.

For benchmark numbers, the following two cases were performed (e.g., for "small" records):
(a) GET a record which is the last one from a database ROOT node for a directed_traversal (e.g., the longest URI node string comparison);
(b) GET a record which is a deepest nested case (e.g., get tbl_RuleSsidList from tbl_RuleData/tbl_RuleCondition/tbl_RuleSsidList).

For (a), the current URI system took 52429 us (19073 records/sec), while the efficient graph database traversal system herein only took 24926 us (40118 records/sec). For (b), the current URI system took 105349 us (9492 records/sec), while the techniques herein only took 57442 us (17408 records/sec).

While there have been shown and described illustrative embodiments, it is to be understood that various other adaptations and modifications may be made within the spirit and scope of the embodiments herein. For example, the embodiments have been shown and described herein using certain terminology and operating system references. However, the embodiments in their broader sense are not as limited, and may, in fact, be used with other types of operating systems, whether for computer networks or computing devices in general. In addition, while certain protocols may have been shown, other suitable protocols may be used, accordingly.

For example, model-specific business logic of the database front-end may be generated from the programming-language-independent TDL. As a result, it can be quickly generated to run in different runtime environments. As an example, there may be a C and a JavaScript variance of the database front-end (e.g., where the JavaScript variance runs in the WEBUI whereas the C variance runs to serve CLI, SNMP, and other queries on a device).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   interfacing, by an operating system on a computer device, with a graph database that has data nodes interconnected by relationship edges, wherein the operating system is a network operating system;
   initiating, by the operating system, a query or a reply operation as a database operation; and
   in response to initiating the database operation:
      generating, by the operating system, a binary encoded database instruction for the database operation, wherein the database operation is the query operation or the reply operation;
      specifying, within the binary encoded database instruction by the operating system, the database operation for a target node in the graph database;
      specifying, within the binary encoded database instruction by the operating system, a node traversal list through the graph database to reach the target node, wherein the node traversal list includes offset values pointing from each traversed node to each subsequent node of the graph database, and further wherein each vector of an array of vectors specify an offset value at each level of an intra-node query and the node traversal list provides a path for the database operation through the graph database; and
      transmitting, from the operating system, the binary encoded database instruction to the graph database to cause the graph database to traverse the node traversal list through the graph database to the target node and to perform the database operation on the target node.

2. The method as in claim 1, wherein the node traversal list comprises an encoded key for each of one or more encoded data nodes in the node traversal list.

3. The method as in claim 1, further comprising:
   specifying, within the binary encoded database instruction, one or more parameters indicating individual attributes in the target node to be operated upon according to the database operation.

4. The method as in claim 1, further comprising:
specifying, within the binary encoded database instruction, one or more filters for the database operation.

5. The method as in claim 1, further comprising:
batching a plurality of binary encoded database instructions.

6. The method as in claim 1, further comprising:
subscribing, by the binary encoded database instruction, to receive updates performed to the target node.

7. The method as in claim 1, further comprising:
receiving a reply from the graph database having the node traversal list and one or more associated data values from the target node.

8. The method as in claim 1, further comprising:
providing an application programming interface (API) configured to receive parameters and convert the parameters into the binary encoded database instruction.

9. A tangible, non-transitory, computer-readable media having software encoded thereon, the software, when executed by a processor, operable to:
interface with a graph database that has data nodes interconnected by relationship edges;
initiate a query or a reply operation as a database operation in a network operation system; and
in response to initiating the database operation:
generate a binary encoded database instruction for the database operation, wherein the database operation is the query operation or the reply operation;
specify, within the binary encoded database instruction, the database operation for a target node in the graph database;
specify, within the binary encoded database instruction, a node traversal list through the graph database to reach the target node, wherein the node traversal list includes offset values pointing from each traversed node to each subsequent node of the graph database, and further wherein each vector of an array of vectors specify an offset value at each level of an intra-node query and the node traversal list provides a path for the database operation through the graph database; and
transmit the binary encoded database instruction to the graph database to cause the graph database to traverse the node traversal list through the graph database to the target node and to perform the database operation on the target node.

10. The computer-readable media as in claim 9, wherein the software, when executed, is further operable to:
specify, within the binary encoded database instruction, one or more parameters indicating individual attributes in the target node to be operated upon according to the database operation.

11. The computer-readable media as in claim 9, wherein the software, when executed, is further operable to:
specify, within the binary encoded database instruction, one or more filters for the database operation.

12. The computer-readable media as in claim 9, wherein the software, when executed, is further operable to:
batch a plurality of binary encoded database instructions.

13. A method, comprising:
managing, by an operating system on a computer device, a graph database that has data nodes interconnected by relationship edges, wherein the operating system is a network operating system;
receiving, by the operating system, a binary encoded database instruction that includes a query for a target node in the graph database and a binary encoded node traversal list through the graph database to reach the target node, wherein the node traversal list includes offset values pointing from each traversed node to each subsequent node of the graph database, and further wherein each vector of an array of vectors specify an offset value at each level of an intra-node query and the node traversal list provides a path for the database operation through the graph database;
in response to receiving the binary encoded database instruction, traversing, by the operating system, the node traversal list through the graph database to the target node; and
initiating, by the operating system, the query on the target node.

14. The method as in claim 13, further comprising:
transmitting a reply having the node traversal list and one or more associated data values from the target node.

15. The method as in claim 13, wherein the binary encoded database instruction further includes:
one or more parameters indicating individual attributes in the target node to be operated upon according to the database operation.

16. The method as in claim 13, wherein the binary encoded database instruction further includes:
one or more filters for the database operation.

17. The method as in claim 13, wherein the binary encoded database instruction further includes a lookup type.

18. The method as in claim 13, wherein the binary encoded database instruction is received as a batch of a plurality of binary encoded database instructions.

19. The method as in claim 13, wherein the binary encoded database instruction subscribes the operating system to receive updates performed to the target node.

20. The method as in claim 1, wherein the binary encoded database instruction further includes a lookup type.

* * * * *